United States Patent

[11] 3,581,422

| [72] | Inventor | Hidenobu Kondo<br>Kawasaki-shi, Japan |
| [21] | Appl. No. | 847,114 |
| [22] | Filed | Aug. 4, 1969 |
| [45] | Patented | June 1, 1971 |
| [73] | Assignee | Nippon Kogaku K.K.<br>Tokyo, Japan |
| [32] | Priority | Aug. 8, 1968 |
| [33] | | Japan |
| [31] | | 43/68244 |

[54] FILM HOLDER FOR SLIDE PROJECTOR
3 Claims, 7 Drawing Figs.

| [52] | U.S. Cl. | 40/152 |
| [51] | Int. Cl. | G09F 1/12 |
| [50] | Field of Search | 40/152, 10, 156, 158 |

[56] References Cited
UNITED STATES PATENTS

| 2,490,058 | 12/1949 | Jablon | 40/152 |
| 2,505,250 | 4/1950 | Kime et al. | 40/152 |
| 2,841,903 | 7/1958 | Christensen | 40/152 |
| 2,874,498 | 2/1959 | Butkevich | 40/152 |
| 3,150,457 | 9/1964 | Thieme | 40/152 |

*Primary Examiner*—Robert W. Mitchell
*Assistant Examiner*—Wengeslao J. Contreras
*Attorney*—Ward, McElhannon, Brooks, & Fitzpatrick ABSTRACT: A slide film frame for slide projector enables to mounting, dismounting and interchanging of the film with ease. Two glass plates with a film sandwiched therebetween are inserted into the intermediate case of the main frame, and then the main frame is put on one of the covers having arcuated dovetail grooves and thereafter the remaining cover having four projections fittable with the grooves when two covers are relatively rotated by 90°, is put thereon.

PATENTED JUN 1 1971  3,581,422

FILM HOLDER FOR SLIDE PROJECTOR

This invention relates to a slide-frame for transparencies and more particularly to a film frame or holder for slide projector.

In a conventional film holder made of paper, it was impossible, once a film had been mounted, to reuse the holder by ripping it off.

An object of this invention is to offer a film holder which allows the mounting, dismounting, and interchanging of the film in simple ways.

A slide frame according to this invention comprises a pair of protecting glass plates for holding a transparent material such as film therebetween, a main frame having a recess for receiving said glass plates and a film aperture provided at the bottom of said recess, two square covers each provided with a window having larger dimension than said film aperture and for holding the main frame therebetween, the first cover having four arcuated corners each formed at the beveled face and the second cover having at its four corners projections having beveled faces engageable with said arcuated corners of the first cover, whereby said two covers being interconnected to each other for holding the main frame and glass plates when the two covers are relatively rotated with a proper angle.

This invention will be described more clearly referring to the illustrative embodiment shown in the attached drawings, in which.

Figure 1:
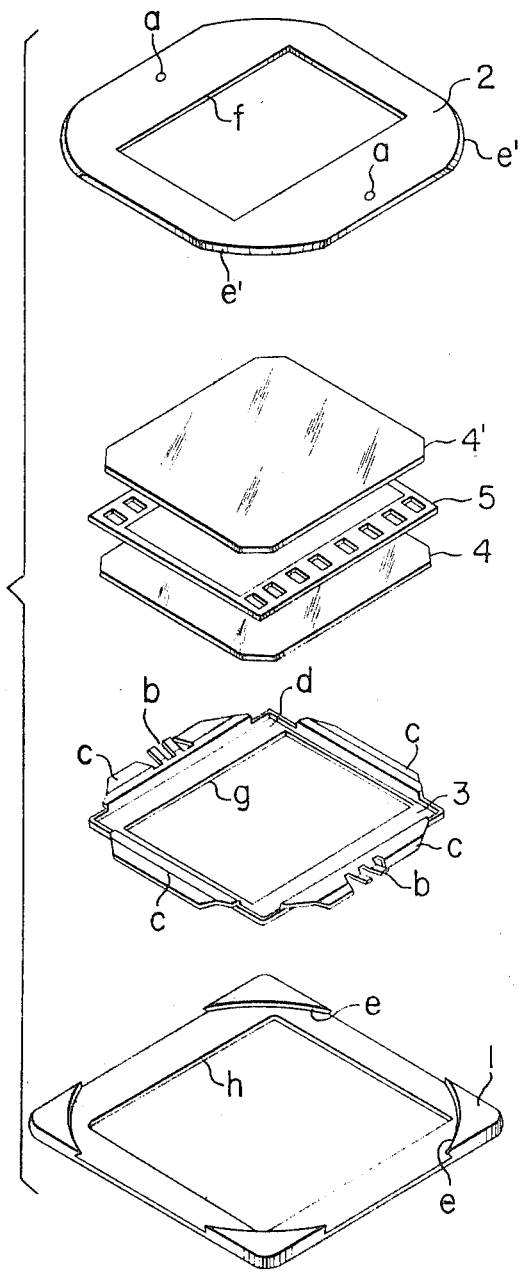
FIG. 1 is an exploded, perspective view of an embodiment of this invention.
Figure 2:
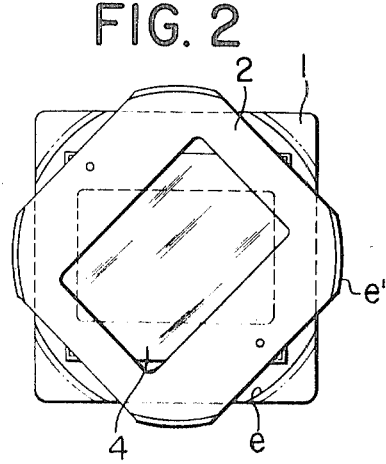
FIG. 2 is a plane view showing the state when two covers of the embodiment are made to engage with each other.

In FIG. 1, 1 is a first cover having dovetail grooves $e$ at four corners and a window $h$ in the center, 2 is second cover having projections $e'$, which engage with the dovetail grooves $e$ of the first cover 1, on four corners, stop clicks $a$ at two places on the edge, and a window $f$ at the center, 3 is a main frame insertable within said window $h$ of the first cover 1 and having leaf springs $c$ on each side, two of which are provided with click spring pieces $b$, and a central aperture $g$, a little smaller than the window $f$ of the second cover 2. Plates 4 and 4' are made of glass and a slide film 5 is sandwiched between glass plates 4 and 4'.

Figure 3:
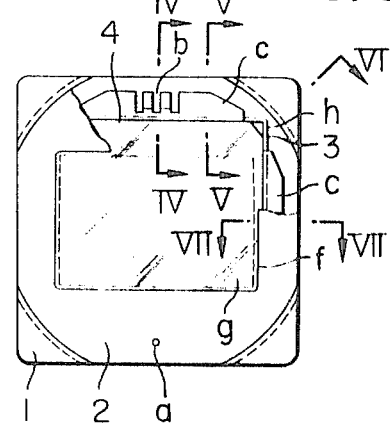
FIG. 3 is a plane view of partial cross section of the embodiment.
Figures 4, 5:
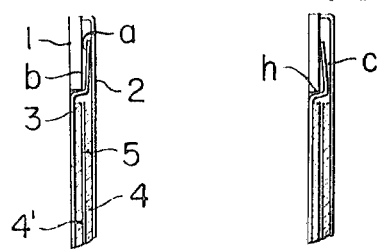
FIG. 4 is a magnified partial cross section of FIG. 3 viewed from the line IV–IV.
FIG. 5 is a magnified partial cross section of FIG. 3 viewed from the line V–V.
Figure 6:
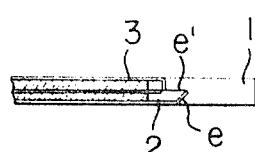
FIG. 6 is a magnified partial cross section of FIG. 3 viewed from the line VI–VI.
Figure 7:
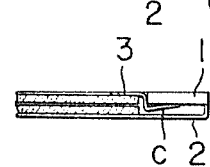
FIG. 7 is a magnified partial cross section of FIG. 3 viewed from the line VII–VII.

With such a construction, the main frame 3 is placed in the window $h$ of the first cover 1, the glass plate 4, film 5, and glass plate 4' are inserted into the intermediate case $d$ of the said frame 3 in this order, and then the second cover 2 is put on the first cover 1 and rotated 90°, while being pressed down at the edge, to come in the state as shown in FIG. 3. At this position, the arcuated corners $e'$ of the second cover 2 and the dovetail grooves $e$ of the first cover 1 are made to engage with each other as shown in FIG. 6 and the second cover or pressure frame 2 is stopped by the clicks $a$ and the click spring pieces $b$. FIG. 4 shows the cross section. At this position the film 5 is sandwiched closely and fixed between the glass plates 4 and 4' by the action of the leaf spring $c$ of the main frame 3. FIGS. 5 and 7 shown this situation.

I claim:

1. A slide-frame for transparencies comprising,
   a pair of protecting glass plates for holding a transparent material therebetween;
   a main frame having a recess for receiving said glass plates and a film aperture provided at the bottom of said recess;
   two square covers each provided with a window having larger dimension than said film aperture and for holding said main frame therebetween, the first cover having four arcuated corners each formed with a beveled groove, and the second cover having at its four corners projections having beveled faces engageable with said arcuated corners of the first cover, whereby said two covers being interconnected to each other for holding said main frame and said glass plates when the two covers are relatively rotated with a proper angle.

2. A slide frame according to claim 1, which further comprising two flanges having spring action provided at the periphery of the main frame, wherein said window of the first cover is formed as having slightly larger dimension than said film aperture, and the window of the second cover is formed as having slightly larger dimension than the periphery of the main frame for inserting the frame within the window, whereby when said two plates are interconnected one of said glass plates is contacted with said first cover and said flanges of said main frame is contacted with said second cover.

3. A slide frame according to claim 2, which further comprising a projection on the second cover and forked leaf spring provided at the periphery of said main frame, whereby when said two plates are interconnected said projection engages with said forked leaf spring to contribute a click stop action.